US008163357B2

(12) United States Patent
Engardio et al.

(10) Patent No.: US 8,163,357 B2
(45) Date of Patent: Apr. 24, 2012

(54) SCRATCH-RESISTANT COATINGS WITH IMPROVED ADHESION TO INORGANIC THIN FILM COATINGS

(75) Inventors: Thomas J. Engardio, Vista, CA (US); Geoffrey Yuxin Hu, San Diego, CA (US); Dae Ki Kang, Escondido, CA (US); Erick S. Rorye, Poway, CA (US)

(73) Assignee: Signet Armorlite, Inc., San Marcos, CA (US)

( * ) Notice: Subject to any disclaimer, the term of this patent is extended or adjusted under 35 U.S.C. 154(b) by 302 days.

(21) Appl. No.: 12/383,605

(22) Filed: Mar. 26, 2009

(65) Prior Publication Data

US 2010/0249265 A1  Sep. 30, 2010

(51) Int. Cl.
*B05D 3/00* (2006.01)
(52) U.S. Cl. ........ 427/532; 427/331; 427/539; 427/553; 426/446; 426/447; 526/279; 526/323.1; 526/323.2
(58) Field of Classification Search .................. None
See application file for complete search history.

(56) References Cited

U.S. PATENT DOCUMENTS

| | | | |
|---|---|---|---|
| 4,210,699 A | 7/1980 | Schroeter et al. | |
| 4,239,798 A | 12/1980 | Schroeter et al. | |
| 4,348,462 A | 9/1982 | Chung | |
| 4,455,205 A | 6/1984 | Olson et al. | |
| 4,486,504 A | 12/1984 | Chung | |
| 4,491,508 A | 1/1985 | Olson et al. | |
| 4,544,572 A | 10/1985 | Sandvig et al. | |
| 4,758,448 A | 7/1988 | Sandvig et al. | |
| 4,889,901 A | 12/1989 | Shama et al. | |
| 4,973,612 A | 11/1990 | Cottington et al. | |
| 5,015,523 A | 5/1991 | Kawashima et al. | |
| 5,059,448 A | 10/1991 | Chandra et al. | |
| 5,075,348 A | 12/1991 | Revis et al. | |
| 5,104,929 A | 4/1992 | Bilkadi | |
| 5,188,900 A | 2/1993 | Revis et al. | |
| 5,258,225 A | 11/1993 | Katsamberis | |
| 5,374,483 A | 12/1994 | Wright | |
| 5,426,131 A | 6/1995 | Katsamberis | |
| 5,619,288 A | 4/1997 | White, Jr. et al. | |
| 5,677,050 A | 10/1997 | Bilkadi et al. | |
| 5,695,851 A | 12/1997 | Watanabe et al. | |
| 5,827,923 A | 10/1998 | Medford et al. | |
| 5,858,544 A | 1/1999 | Banaszak Holl et al. | |
| 5,945,172 A * | 8/1999 | Yamaya et al. ............... | 427/503 |
| 6,051,310 A | 4/2000 | Cano et al. | |
| 6,306,502 B1 | 10/2001 | Fukushima et al. | |
| 6,451,420 B1 | 9/2002 | Jin et al. | |
| 6,606,196 B2 | 8/2003 | Mitsuishi et al. | |
| 6,607,590 B2 | 8/2003 | Jin et al. | |
| 6,699,586 B2 | 3/2004 | Edelmann et al. | |
| 6,716,919 B2 | 4/2004 | Lichtenhan et al. | |
| 6,809,149 B2 | 10/2004 | Meyer et al. | |
| 6,830,816 B2 | 12/2004 | Mehnert et al. | |
| 6,846,568 B2 | 1/2005 | Yamaya et al. | |
| 6,863,848 B2 | 3/2005 | Engardio et al. | |
| 6,873,026 B1 | 3/2005 | Brunemeier et al. | |
| 6,903,148 B2 | 6/2005 | Suzuki et al. | |
| 6,916,545 B2 | 7/2005 | Yano et al. | |
| 6,919,134 B2 | 7/2005 | Mitsuishi et al. | |
| 7,153,584 B2 | 12/2006 | Shirakawa et al. | |
| 7,156,530 B2 | 1/2007 | Miyatake et al. | |
| 7,198,639 B2 | 4/2007 | Lai et al. | |
| 7,217,440 B2 | 5/2007 | Jallouli et al. | |
| 7,265,194 B1 | 9/2007 | Lichtenhan et al. | |
| 7,285,603 B2 | 10/2007 | Vu | |
| 7,381,471 B2 | 6/2008 | Augustine et al. | |
| 2002/0192476 A1 | 12/2002 | Kambe et al. | |
| 2003/0129422 A1 | 7/2003 | Shirakawa et al. | |
| 2003/0134130 A1 | 7/2003 | Yano et al. | |
| 2003/0194571 A1 | 10/2003 | Takaguchi et al. | |
| 2003/0207129 A1 | 11/2003 | Kambe et al. | |
| 2003/0215649 A1 | 11/2003 | Jelle | |
| 2004/0151918 A9 | 8/2004 | Mitsuishi et al. | |
| 2004/0214019 A1 | 10/2004 | McGall et al. | |
| 2005/0069708 A1 | 3/2005 | Isarov et al. | |
| 2005/0170192 A1 | 8/2005 | Kambe et al. | |
| 2005/0192364 A1 | 9/2005 | Lichtenhan et al. | |
| 2005/0214549 A1 | 9/2005 | Ishihara et al. | |
| 2005/0238871 A1 | 10/2005 | Robinson et al. | |
| 2005/0244658 A1 | 11/2005 | Bae et al. | |
| 2005/0255326 A1 | 11/2005 | Sakurai et al. | |
| 2006/0114409 A1 | 6/2006 | Kunzler et al. | |
| 2006/0251884 A1 | 11/2006 | Naito et al. | |
| 2007/0036965 A1 | 2/2007 | Fukushige et al. | |
| 2007/0212557 A1 | 9/2007 | Higuchi et al. | |
| 2007/0264508 A1 | 11/2007 | Gabelnick et al. | |
| 2008/0006798 A1 | 1/2008 | Evans et al. | |
| 2008/0131701 A1 * | 6/2008 | Hanson ........................ | 428/412 |
| 2009/0026638 A1 | 1/2009 | Diggins et al. | |

OTHER PUBLICATIONS

Abstract of a paper presented at the 2008 Nashville Meeting of the ACS entitled "Effect of UV/O3 on Poly(Methyl Methacrylate-Co-3-methacrylpropylheptaisobutyl-T8-Polyhedral Oligomeric Silsesquioxane" authored by Arockiasamy et al.*
"Plasma Oxidation of Polyhedral Oligomeric Silsesquioxane Polymers" authored by Eon et al. and published in the Journal of Vacuum Science and Technology B (2006) 24(6), 2678-2687.*

* cited by examiner

*Primary Examiner* — Marc Zimmer
(74) *Attorney, Agent, or Firm* — Ice Miller LLP

(57) ABSTRACT

A scratch-resistant coating comprising a polymer including a functionalized polysilsesquioxane. The scratch-resistant coating is exposed to oxidizing conditions (e.g., ozone or ultraviolet light) that modify the surface chemistry of the coating to enhance adhesion to inorganic thin film coatings, such as antireflective coatings.

38 Claims, No Drawings

SCRATCH-RESISTANT COATINGS WITH IMPROVED ADHESION TO INORGANIC THIN FILM COATINGS

BACKGROUND OF THE INVENTION

The present invention relates to scratch-resistant coatings for plastic articles, such as ophthalmic spectacle lenses and, in particular, to scratch-resistant coatings having improved adhesion to inorganic thin film coatings, such as antireflective coatings, mirror coatings and the like.

The application of scratch-resistant coatings to ophthalmic spectacle lenses is well known in the art. Scratch-resistant coatings are typically applied to plastic spectacle lenses, where the lens materials do not have a high degree of inherent scratch resistance—e.g., lenses made from injection molded polycarbonate or cast polymerizable monomers such as allyl diglycol carbonate. The scratch-resistant coatings are commonly applied by various techniques such as by spinning, dipping, or flowing the coating onto the substrate lens and curing the coating, usually by thermal or ultraviolet (UV) methods.

Another method of applying the scratch-resistant coating, referred to as "in-mold" coating, is described in U.S. Pat. Nos. 4,544,572 and 4,758,448, which are hereby incorporated by reference. This technique involves coating a mold used to form a cast lens with a polymerizable composition containing reactive ethylenically unsaturated groups, such as acrylates or vinyl compounds. The coating on the mold is then partially cured, such that some of the reactive groups remain available to form chemical bonds with the lens material. The coated mold is then used to cast an ophthalmic lens using a polymerizable composition also having reactive ethylenically unsaturated groups, such as allyl diglycol carbonate. When the lens material is cured and removed from the mold, the scratch-resistant coating is chemically bonded to the surface of the lens, imparting abrasion resistant properties.

Compositions used for in-mold scratch-resistant coatings frequently consist of multifunctional acrylic or methacrylic aliphatic monomers, multifunctional urethane(meth)acrylate oligomers or mixtures thereof. The term (meth)acrylate means the monomers or oligomers have either acrylate or methacrylate functionality. The resulting coating is hard and very abrasion resistant. The coating is optically clear, chemically resistant and resistant to degradation by sunlight (such as is evidenced by yellowing). Additionally, these coatings generally release relatively easily from the glass mold after polymerization of the lens. Such coatings also form chemical bonds with the lens materials during polymerization and, therefore, are very well bonded to the substrate lens.

In recent years, it has become popular to apply antireflective coatings to the surfaces of ophthalmic lenses. Antireflective coatings can significantly reduce the reflected light from the rear surface (the surface closest to the eye) of the spectacle lens, which is an annoyance to the wearer, and from the front surface of the lens, which improves the aesthetic appeal of the lens. Furthermore, because less light is reflected from the lens surfaces having antireflective coatings, more light is transmitted through the lens. It has also become popular to apply reflective inorganic thin film coatings to the surfaces of ophthalmic lenses particularly for certain lenses used for sunwear (eg. "mirror coatings").

Antireflective coatings commonly consist of multiple thin layers of minerals, such as metal and metalloid oxides, having alternating relatively high and low index of refraction values. The ability of the first layer to adhere to the underlying scratch-resistant coating can affect how well the antireflective coating as a whole will adhere to the lens. Metal oxides and metalloid oxides such as silicon oxides often do not adhere well to organic scratch-resistant coatings—e.g., coatings made from multifunctional aliphatic(meth)acrylates and/or multifunctional urethane(meth)acrylate oligomers. Poor adhesion results in the gradual delamination of the antireflective coating over time and shortens the lifespan of the antireflective coating. Thus it would be desirable to provide a coating that is capable of being applied by in-mold coating techniques that is scratch-resistant and that has improved adhesion to antireflective coatings.

SUMMARY OF THE INVENTION

Scratch resistant coatings for an ophthalmic lens are disclosed, comprising a polymer including a polysilsesquioxane, and wherein the coating is chemically modified by exposure to oxidizing conditions. In one embodiment, the ophthalmic lens comprises an optical lens, a scratch-resistant coating on the surface of the optical lens. The scratch-resistant coating comprises a polymer including a polysilsesquioxane, and the surface of the scratch-resistant coating is chemically modified by exposure to oxidizing conditions. An inorganic thin film coating is applied on the surface of the scratch-resistant coating. In yet another embodiment, the scratch resistant coating further comprises a monomer, and the polysilsesquioxane has a reactive group that is capable of forming a polysilsesquioxane polymer and/or a copolymer of the polysilsesquioxane and the monomer.

Methods of making an ophthalmic lens having a scratch-resistant coating are also disclosed, comprising the steps of providing a polymerizable scratch-resistant coating composition comprising a polysilsesquioxane. The scratch-resistant coating composition is polymerized on the surface of a lens, and exposed to oxidizing conditions.

DETAILED DESCRIPTION OF THE INVENTION

Inorganic thin film coatings for optical materials are well known in the art. For example, antireflective coatings typically consist of either a single layer of a relatively low refractive index material, such as magnesium fluoride, or multiple layers of dielectric materials arranged as a stack of alternating layers of high and low refractive index. These dielectric materials commonly comprise metal oxides and metalloid oxides of silicon, titanium, zirconium, hafnium and the like. The layers can be applied by vacuum deposition techniques such as sputtering, chemical vapor deposition, or physical vapor deposition and have an optical thicknesses equivalent to a quarter wavelength of light or an odd number of quarter wavelengths of light for each layer. A light wavelength of 550 nm is often used for the calculation, additionally considering the index of refraction for the materials.

The exact composition and methods of constructing antireflective coatings are typically proprietary to the manufacturer. The surface of the substrate lens is typically pre-cleaned prior to the application of the antireflective coating—e.g., with a weak caustic solution or an ion gun pre-cleaning process. The initial layer of the antireflective coating stack that is applied adjacent to the surface of the lens frequently comprise silicon oxides, chromium and/or other metals and metal oxides that are often difficult to adhere to lenses that have in-mold scratch-resistant coatings, particularly in combination with the pre-cleaning step.

It would be desirable to add an inorganic oxide, such as silica, to the scratch-resistant coating to improve adhesion to the metal oxides used in the antireflective coating or other inorganic thin film coating. The use of silica nanoparticles in coatings for the improvement of abrasion resistance is known in the art. However, such materials have been problematic for use in optical applications, such as coatings for ophthalmic lenses and, particularly, in-mold coated lenses. Silica nanoparticles are very sensitive to their chemical environment, and readily agglomerate under many circumstances. Typically, these particles are provided as dispersions in solvents, such as isopropanol or occasionally in certain monomers. Agglomeration frequently occurs when these dispersions are added to acrylic materials commonly used for in-mold scratch-resistant coatings. The agglomeration of the nanoparticles results in a hazy coating, that is unacceptable for optical materials. Additionally, the silica nanoparticles have an affinity for the glass molds used to cast ophthalmic lenses, making it difficult to separate the cast lens from the glass mold.

Contrary to the use of conventional silica nanoparticles, the inventors have found that scratch-resistant coatings incorporating new classes of silica nanoparticles with attached organic pendant groups can overcome the problems of agglomeration and can also provide for easier separation of the coated lens from the glass mold. In addition, the incorporation of these functionalized particles into the scratch-resistant coating can improve the adhesion of antireflective coatings and other inorganic thin film coatings to the lens. Adhesion of inorganic thin film coatings can be further enhanced by chemical modification of the surface of the scratch-resistant coating by exposure to oxidizing conditions—e.g., by exposure to short wavelength ultraviolet light, electron beams, or oxidizing agents, such as ozone.

Polysilsesquioxane compounds and, particularly, functionalized polysilsesquioxanes, have been found to be advantageous for making scratch-resistant coatings with improved adhesion to inorganic thin film coatings. The polysilsesquioxane is provided with reactive substituent groups that can form chemical bonds either between polysilsesquioxane molecules and/or with other reactive compounds that are capable of polymerizing with the polysilsesquioxane to form the scratch-resistant coating. The resulting coating may be treated to modify the chemistry of the polysilsesquioxane molecules at the surface of the lens to promote bonding with the initial layer of an antireflective coating stack. Modification of the scratch-resistant coating may be accomplished by a variety of means, including treatment of the lens with ozone, oxygen plasma, exposure to short wavelength ultraviolet light, electron beam radiation or similar means.

Suitable polysilsesquioxane compounds greatly reduce the problems of haziness caused by agglomeration of the nanoparticles, and contain one or more substituent (R) groups attached to one or more of the silicon atoms. The polysilsesquioxanes contemplated for use in the practice of the present invention include polyhedral oligomeric silsesquioxanes having the general formula $[(RSiO_{1.5})n]\Sigma n(Tn)$, where n is an even number, and polyhedral oligomeric silicates having the general formula $[R_{n+2}Si_{n-1}O_{1.5n-3}]\Sigma n(T_{n-1})$, where n is an even number, and their analogs and derivatives. An example of suitable polyhedral oligomeric silsequioxane compounds having structures A and B, are shown below:

(A)

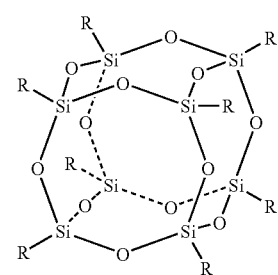

(B)

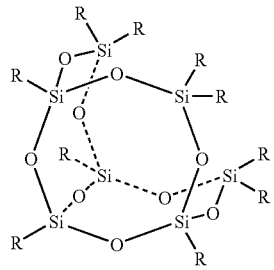

In a preferred embodiment, at least one of the substituent (R) group or groups are selected that are capable of forming chemical bonds between polysilsesquioxane molecules and/or are capable of forming chemical bonds with other monomers and/or oligomers that may comprise the coating. In addition, the substituent (R) groups may also be capable of forming chemical bonds with the substrate, such as a plastic lens. In a particularly preferred embodiment, the polyhedral oligomeric silsesquioxane compound contains one or more substituent groups that are capable of chemically bonding to the materials used for plastic lenses to permit in-mold coating such as epoxy groups or groups that are ethylenically unsaturated, such as allyl, vinyl, acrylic or methacrylic groups. An example of a suitable polyhedral oligomeric silsesquioxane compound that contains multiple methacrylate groups is commercially available as MA0735 Methacryl POSS® Cage Mixture (Hybrid Plastics, Inc.—Hattiesburg, Miss.).

The polysilsesquioxane compound can be used alone, or in combination with one or more monomers that are capable of copolymerizing with it. The monomers may also comprise monomer oligomers. For example, in the case of a polyhedral oligomeric silsesquioxane compound such as MA0735 that contains methacrylate substituent groups, suitable monomers and oligomers include acrylic or methacrylic esters, and monomers and oligomers that contain acrylate or methacrylate functionality.

The specific monomers (and/or oligomers) incorporated into the coating can be selected depending on the desired properties of the coating. For example, a tough oligomer having higher tensile elongation characteristics might be chosen to provide resistance to cracking for thin lenses subject to flexing during certain lens treatment processes. Multifunctional (meth)acrylic monomers (and/or oligomers) are particularly useful for forming highly scratch-resistant coatings. Examples of suitable (meth)acrylic monomers (and/or oligomers) that will form scratch-resistant coatings with polyhedral oligomeric silsesquioxane compounds containing ethylenically unsaturated substituent groups include: pentaerythritol triacrylate, pentaerythritol tetraacrylate, dipentaerythritol pentaacrylate, dipentaerythritol hexacrylate, aliphatic and aromatic urethane acrylates and methacrylates, polyester acrylates and methacrylates and the like.

The composition of the scratch-resistant coating may comprise as much as 100% of the polysilsesquioxane compound. In a preferred embodiment, the scratch-resistant coating composition contains from about 10 wt % to about 100 wt % polysilsesquioxane, more preferably, between about 20 wt % to about 100 wt % polysilsesquioxane and, most preferably, between about 30 wt % to about 100 wt % polyhedral oligomeric silsesquioxane, where wt % refers to the weight percentage of polysilsesquioxane in the mixture of polysilsesquioxane and any monomers and/or oligomers present in the composition. The composition may also contain additives, such as photoinitiators, surfactants, light stabilizers, dyes, and adhesion promoters. The additives preferably comprise about 10 wt % or less of the total solids in the scratch-resistant coating composition, and more preferably about 7 wt % or less.

The scratch-resistant coating composition of the present invention can be applied directly to the surface of a lens by, for example, flow coating, spin coating or dip coating, as are known in the art. The coating can then be cured using ultraviolet light or thermally cured by heat, depending on the polymerization method employed that is suitable for the coating. In a preferred embodiment, the scratch-resistant coating composition is applied using an in-mold process. Methods for preparing in-mold coated ophthalmic lenses are well known in the art and are described in U.S. Pat. Nos. 4,544,572 and 4,758,448, which are hereby incorporated by reference. The scratch-resistant coating composition containing a photoinitiator is applied to the casting surface of a mold used to cast the lens. The coating is then exposed to actinic radiation sufficient to activate the photoinitiator and partially polymerize the coating, such that there is residual unsaturation resulting from unreacted substituent (R)—e.g., (meth)acrylate groups—in the coating composition. The lens mold is then assembled and the lens casting composition is introduced into the mold in contact with the scratch-resistant coating. The lens casting composition is then polymerized and the residual unsaturation of the coating is available for covalent bonding to the polymerizing lens composition. After polymerization, the lens is separated from the lens mold. The coating is well adhered to the lens body and may be optionally exposed to further actinic radiation to completely cure and harden the coating either immediately before or after disassembly of the lens mold.

The cast lens may be treated to enhance the adhesion of a subsequent inorganic thin film coating, such as an antireflective coating. Without wishing to be limited to any particular theory, subjecting the lens to oxidizing conditions is believed to modify the surface chemistry of the scratch-resistant coating by breaking the chemical bonds of the coating to make the silicon and/or silicon-oxygen species of the polysilsesquioxane available for bonding with the mineral coating. Suitable treatment methods include exposure to ozone, oxygen plasma, or other oxidizing agents.

In a preferred embodiment, the scratch-resistant coating is modified by exposure to short wavelength ultraviolet (UV) light. UV light provides a number of advantages over ozone, oxygen plasma and other methods. In particular, treatment with UV light is inexpensive, efficient, clean and can be performed at atmospheric pressure and in ambient conditions. Thus, treatment with UV light is easily incorporated into commercial manufacturing processes, without the need for additional equipment or reagents, or the requirement for special conditions, such as vacuum. The UV exposure also appears to increase the surface roughness of the scratch-resistant coatings of the present invention, which is believed to assist in the adhesion to inorganic thin film coatings.

The UV light preferably comprises wavelengths less than 300 nm and, more preferably, less than about 200 nm. These wavelengths possess sufficient energy to break a large number of chemical bond types. Lamps capable of generating short wavelength ultraviolet light are commercially available and are commonly used in cleaning and sterilization processes. Examples of suitable lamps include mercury discharge lamps made using quartz envelopes that can transmit the short wavelengths required, typically the 185 nm mercury line. Additionally, mercury lamps are relatively inexpensive and long lived. Xenon excimer lamps can also be employed, such as those that emit light at 172 nm, which is capable of cleaving more chemical bond types.

The working distance between the scratch-resistant coating and the UV lamp, and the time of exposure to the ultraviolet light depend upon the irradiance at the coating surface and the coating composition. With too little exposure, not enough bonds will be modified to promote adhesion to the antireflective coating. If the exposure is too great, the abrasion resistance of the scratch-resistant coating will be reduced.

Those of skill in the art will appreciate that the working distance between the UV lamp and the scratch-resistant coating is affected by atmospheric absorption, particularly by oxygen in the air. Shorter wavelengths are particularly impacted. In atmospheric conditions, the working distance for light at 185 nm will be greater than the working distance for light at 172 nm. Thus, if shorter wavelengths are required, it may be desirable to use a less absorbing atmosphere—eg., nitrogen or a vacuum—to ensure sufficient working distance between the lamp and the scratch-resistant surface. In a preferred embodiment, the working distance for light at 185 nm in atmospheric conditions is about 1 cm to about 3 cm from the quartz envelope of the UV lamp. This working distance has been found to be satisfactory to accommodate the variations encountered in ophthalmic lens geometries under atmospheric conditions.

Highly cross-linked scratch-resistant coating compositions exhibiting relatively high hardness may require somewhat longer exposure times than softer compositions, in order to enhance adhesion to inorganic thin film coatings. Thus, scratch-resistant coating compositions comprising higher ratios of polysilsesquioxanes to monomers (and/or oligomers), for example from about 65 wt. % to 100 wt. % polysilsesquioxane, may require shorter exposure times than compositions containing, for example, about 25 wt. % to about 35 wt. % polysilsesquioxane. In a preferred embodiment, for polysilsequioxane concentrations of about 25 wt % to about 100 wt %, the exposure time to 185 nm wavelength light with an irradiance of about 10 milliwatts/cm$^2$ is about 1 minute to about 8 minutes and, more preferably, about 2 minutes to about 4 minutes.

An advantage of the treated lenses is that the modification of the surface chemistry of the scratch-resistant coatings is permanent. This permits the treated lenses to be inventoried for long periods of time after treatment (months or years) prior to being processed to receive the antireflective coating. Additionally, the treated lenses can be processed conventionally, e.g., stamped with commonly used ink markings, covered with surface protecting tape for blocking and subsequent processing of the non-finished surface by grinding and polishing equipment, and subsequently cleaned by common solvents such as isopropyl alcohol or water. The preceding process steps do not affect the ability of the modified scratch-resistant coating to bond well to subsequently applied antireflective coatings.

The following examples are included to demonstrate preferred embodiments of the invention. It should be appreciated by those of skill in the art that the techniques disclosed in the examples which follow represent techniques discovered by the inventors to function well in the practice of the invention, and thus can be considered to constitute preferred modes for its practice. However, those of skill in the art should, in light of the present disclosure, appreciate that many changes can be made in the specific embodiments which are disclosed and still obtain a like or similar result without departing from the scope of the invention.

EXAMPLE 1

Materials

BR101D is an aliphatic urethane acrylate oligomer with a maximum acrylate functionality of fifteen, available from Bomar Specialties Co. (Torrington, Conn.). Ebecryl 1290 is a hexafunctional aliphatic urethane acrylate oligomer, available from Cytec Surface Specialties (Smyrna, Ga.). Irgacure 184 is a photointiator, 1-hydroxycyclohexyl phenyl ketone, available from Ciba Specialty Chemicals (Basel, Switzerland). CS3503 is an acrylate functional silicone used as a flow agent, available from OSi Specialties (South Charleton, W.Va.). MA0735 Methacryl POSS® is a polyhedral oligomeric silsesquioxane with multiple methacrylate groups, available from Hybrid Plastics, Inc. (Hattiesburg, Miss.).

EXAMPLE 2

Preparation of Lenses with In-Mold Scratch-Resistant Coating

Scratch-resistant coating compositions were prepared as shown in Table 1, with and without the addition of MA0735 Methacryl POSS®. Composition A reflects a conventional scratch-resistant, acrylate-based coating composition suitable for in-mold coating. Composition B contained about 46.8 wt % Methacryl POSS® after evaporation of the methyl ethyl ketone solvent. Compositions A and B had a similar solids content relative to the total coating solution composition and, therefore, are expected to produce coatings of similar thickness.

TABLE 1

|  | Composition A (wt %) | Composition B (wt %) |
| --- | --- | --- |
| BR101D | 21.00 | 11.25 |
| Ebecryl 1290 | 7.00 | 3.75 |
| MA0735 | 0.00 | 15.00 |
| Irgacure 184 | 1.95 | 2.02 |
| CS3503 | 0.06 | 0.06 |
| methyl ethyl ketone | 69.99 | 67.93 |

Compositions A and B were used to produce sample in-mold coated, composite photochromic ophthalmic lenses using methods similar to those described in U.S. Pat. No. 6,863,848, which is hereby incorporated by reference. The coating compositions were applied to the concave surface of a glass mold used to form the front surface of a composite photochromic lens having a surface curvature of approximately 6 diopters. The mold was spun at approximately 400 to 600 revolutions per minute while the coating composition was applied to the mold surface for about two seconds. The mold was allowed to spin for an additional 15 seconds while the solvent evaporated, leaving a generally uniform coating on the mold surface.

The coating composition applied to the mold surface was then exposed to actinic radiation sufficient to partially polymerize the coating to a slightly tacky to tack-free state. The light source was a Fusion UV Systems Inc. (Gaithersburg, Md.) type I300 irradiator equipped with a Fusion UV Systems type "D" lamp and an LC-6 conveyor. The appropriate dosage was obtained when a very light fingerprint to no fingerprint was visible on the coating surface after lightly touching the coating after exposure. Care was taken during the partial polymerization step to ensure that the coating was not cured significantly beyond the slightly tacky to tack-free state. Curing the coating too much may decrease the ability of the coating to adhere to the lens. Conversely, insufficient curing may result in solubilization of the coating by the liquid monomers used to form the lens.

The amount of exposure to light from the type "D" lamp in order to obtain an appropriate amount of partial polymerization of the coating was found to vary depending on the composition of the coating and the lens substrate material. Generally, those coatings having higher levels of polyhedral oligomeric silsesquioxane, in this case MA0735 Methacryl POSS®, were found to require somewhat longer exposure than coatings with lower concentrations or no polyhedral oligomeric silsesquioxane. Typical exposure dosages ranged from about 800 to about 3000 mJ/cm$^2$ as measured by an International Light Model 390 radiometer (International Light Technologies—Peabody, Mass.).

Photochromic matrix compositions were prepared as described in U.S. Pat. No. 6,863,844, which is hereby incorporated by reference. The coated lens mold was fitted with a gasket having an inner wall height of about one millimeter. A sufficient amount of liquid photochromic matrix composition, about six grams, was placed into the coated mold assembly, and the gel-form intermediate and attached rear mold was placed in contact with the photochromic composition forming a closed lens mold assembly.

The lens mold assembly was then exposed to the light of a Fusion UV Systems type "V" lamp with an intensity of about 3.8 mW/cm$^2$ for about 45 minutes. Light intensity was measured using an International Light IL1400 radiometer equipped with a 405 nm narrow bandpass filter. The curing arrangement was such that the light from the "V" lamps first passed through the gel-form, then through the photochromic matrix composition, and finally through the scratch-resistant coating.

The cured lens was removed from the lens mold assembly and further irradiated in an optional post-curing step to ensure that the scratch-resistant coating composition was fully cured. The lens was exposed to light from a Fusion type "H" lamp mounted in an I300 irradiator and conveyor for a dosage of approximately 3000 mJ/cm$^2$ as measured with an International Light Model 390 radiometer. Alternatively, the coating could have been post-cured in the lens mold assembly using a Fusion type "D" lamp at a dosage of approximately 4000 mJ/cm$^2$.

EXAMPLE 3

Abrasion Resistance and Adhesion of the Scratch-Resistant Coating

Sample lenses prepared as described in Example 2 were tested for abrasion resistance by manually rubbing the front surface of the lens with "000" steel wool, using moderate pressure. Both of the coatings corresponding to Compositions A and B were found to have good abrasion resistance and showed minimal scratching of the surface of the lens.

Adhesion of the scratch-resistant coating to the substrate was determined by scoring a 6×6 grid pattern of squares on the surface of the coating using a razor blade assembly having seven blades spaced approximately 1.5 mm apart. A fresh piece of ¾ inch Scotch® 600 tape (3M—St. Paul, Minn.) was applied firmly over the grid pattern and rubbed to assure good contact with the coating. The tape was then pulled off the coating, and the tape and grid pattern on the lens surface were examined for removal of the coating. Both of the coatings corresponding to Compositions A and B were found to adhere strongly to the photochromic matrix substrate, since almost no coating was removed from the grid by the tape.

EXAMPLE 4

UV Modification of the Scratch-Resistant Coating

Sample lenses were prepared as described in Example 2 and were treated by exposure to short wavelength ultraviolet light to modify the surface chemistry of the scratch-resistant coatings. The cured lenses were cleaned by wiping the surface with a tissue wetted with isopropanol and allowing the lens to air dry. The cleaned lenses were exposed to an array of three type G30T6 HV/U Ster-L-Ray® germicidal lamps (Atlantic Ultraviolet Corp.—Hauppauge, N.Y.) for a period of 4 minutes at a distance of two centimeters from the nearest plane of the lamp envelopes. These conditions were found to provide 185 nm irradiance of approximately 10 mw/cm$^2$ as measured with an International Light Model 1400A radiometer equipped with an SEL185 detector and a NS185 narrow pass interference filter for 185 nm (available from International Light Technologies, Peabody, Mass.).

EXAMPLE 5

Application of Antireflective Coating

Sample lenses were prepared as described in Example 2, with and without UV modification of the polyhedral oligomeric silsesquioxane coating as described in Example 4. The lenses were then processed using conventional optical laboratory lens surfacing techniques to produce a finished lens with a power of approximately −2.00 diopters, a center thickness of approximately 1.8 mm and a diameter of approximately 68 mm. An antireflective coating, Endura AR (Satis Vacuum AG Industries), was commercially applied on the scratch-resistant coating at the front surface of the processed lenses, through a process provided by Ozarks Optical Laboratories, Inc. (Springfield, Mo.). The Endura AR coating is known to be especially difficult to adhere to conventional in-mold applied acrylic coatings.

EXAMPLE 6

Adhesion of the Antireflective Coating

Sample lenses with an Endura AR antireflective coating were prepared as described in Example 5 and were tested for adhesion of the antireflective coating to the scratch-resistant coating. Prior to testing, the lenses were exposed to simulated environmental conditions for a period of 160 hours, and were tested at 16 hour intervals. The simulated environmental conditions were as specified in ISO Standard 8980-4:2006(E), Annex B. The lenses were subjected to alternating cycles of water vapor condensation (4 hours) and irradiation with UV and visible light (4 hours) at temperatures between 35° C. and 50° C. for a total environmental exposure time of 16 hours. This process was repeated for a total of ten 16 hour environmental exposure cycles. After each 16 hour exposure cycle, the lenses were washed, dried and tested for adhesion of the antireflective coating to the scratch-resistant coating.

Adhesion of the anti-reflective coating was tested in a similar manner as described in Example 3. A cross-hatch pattern was scored on the front surface of the lens by means of a blade assembly consisting of six blades spaced approximately 1.5 mm apart. The blades were drawn across the lens surface in the direction of the lens radius, and then again across the scored area at an angle of 90 degrees to the lens radius, to produce a cross-hatch pattern forming a 5×5 square grid. The center of the grid was positioned approximately 12 mm from the edge of the lens.

The scored lenses were rinsed with water at about 40° C. and then cleaned using a sponge soaked with a mild solution of dishwashing soap (4 grams of soap to 500 ml water, 40° C.) by gently rubbing the lens surface for four times. The cleaned lenses were rinsed in water at about 40° C. and dried. A fresh, ¾ inch piece of Scotch® 600 tape (3M—St. Paul, Minn.) that was not previously exposed to air was applied to the grid and rubbed with a dull plastic blade to ensure good contact with the scribed surface of the lens. The tape was allowed to remain in contact with the grid for about 90 seconds before being quickly pulled upward and away from the lens surface. Fresh tape is then reapplied to the grid and the process is repeated a total of three times.

The grid surface was examined for removal of the antireflective coating using the following scoring system. A score of "0" indicates that no coating was removed from the surface of the lens in the grid area. A score of "1" indicates that the coating was removed from less than 5% of the total grid area. A score of "2" indicates that the coating was removed from between 5% and 15% of the total grid area. A score of "3" indicates that the coating was removed from between 15% and 35% of the total grid area. A score of "4" indicates that the coating was removed from between 35% and 65% of the total grid area. A score of "5" indicates that the coating was removed from over 65% of the total grid area. Generally, an adhesion score greater than 2 was considered to be unsatisfactory. The resulting averages of the adhesion testing scores are reported in Table 2.

TABLE 2

| | Adhesion Of AR Coating To UV Modified Scratch-Resistant Coating | | | |
|---|---|---|---|---|
| Env. | Composition A | | Composition B | |
| (hrs.) | no UV | UV | no UV | UV |
| 0 | 0 | 0 | 0 | 0 |
| 16 | 1.7 | 0 | 1.3 | 0 |
| 32 | 5 | 1 | 4.3 | 0 |
| 48 | 5 | 1 | 5 | 0 |
| 64 | 5 | 2 | 5 | 0 |
| 80 | 5 | 3 | 5 | 0 |
| 96 | 5 | 4.7 | 5 | 0 |
| 112 | 5 | 4.7 | 5 | 0 |
| 128 | 5 | 5 | 5 | 0 |
| 144 | 5 | 5 | 5 | 0.7 |
| 160 | 5 | 5 | 5 | 0.7 |

As shown in Table 2, lenses prepared with conventional scratch-resistant coatings, Composition A (0 wt % MA0735), and without UV modification, exhibited early failure of the antireflective coating within 1 to 2 16-hour cycles of environmental exposure ("Env."). Adhesion performance was improved somewhat when the scratch-resistant coating was modified by exposure to UV.

Lenses prepared from scratch-resistant coatings containing polyhedral oligomeric silsesquioxane, Composition B (46.8 wt % MA0735), without UV modification exhibited slightly improved adhesion in comparison to Composition A. However, adhesion performance was dramatically improved when the scratch-resistant coating containing polyhedral oligomeric silsesquioxane was modified by exposure to UV, showing little or no removal of the antireflective coating even after 10 16-hour cycles of environmental exposure.

EXAMPLE 7

Ozone Modification of Scratch-Resistant Coating

Scratch-resistant coating compositions containing three different concentrations of polyhedral oligomeric silsesquioxane were prepared from Composition C (28.0 wt % MA0735), Composition D (46.8 wt % MA0735) and Composition E (75.0 wt % MA0735) as shown in Table 3. The coating compositions were then used to prepare in-mold coated, composite photochromic ophthalmic lenses using the methods described in Example 2.

TABLE 3

|  | Composition C (wt %) | Composition D (wt %) | Composition E (wt %) |
| --- | --- | --- | --- |
| BR101D | 15.75 | 11.25 | 4.50 |
| Ebecryl 1290 | 5.25 | 3.75 | 1.50 |
| MA0735 | 9.00 | 15.00 | 24.00 |
| Irgacure 184 | 2.05 | 2.02 | 1.98 |
| CS3503 | 0.04 | 0.03 | 0.01 |
| methyl ethyl ketone | 67.91 | 67.95 | 68.01 |

The cast lenses were prepared with and without modification of the surface chemistry of the scratch-resistant coating by exposure to ozone for a period of 2 hours at a concentration of approximately 55 mg/l in oxygen. The ozone level was monitored by means of a UV-VIS spectrometer, noting the 1 cm path length absorption with the appropriate extinction coefficient for the wavelength. In this case, 275 nm was chosen since the absorbance was too intense for a 1 cm path length at the ozone peak absorption wavelength of about 255 nm.

The ozone treated and untreated lenses were commercially coated with Endura AR as described in Example 5, and then tested and scored for adhesion of the antireflective coating to the scratch-resistant coating after simulated environmental conditions using the methods described in Example 6. The results of adhesion testing are reported in Table 4.

TABLE 4

Adhesion Of AR Coating To Ozone Modified Scratch-Resistant Coating

| Env. | Composition C | | Composition D | | Composition E | |
| --- | --- | --- | --- | --- | --- | --- |
| (hrs.) | no Ozone | Ozone | no Ozone | Ozone | no Ozone | Ozone |
| 0 | 0 | 0 | 0 | 0 | 0 | 0 |
| 16 | 0 | 0 | 0 | 0 | 0.5 | 0 |
| 32 | 0.5 | 0 | 1 | 0 | 1 | 0.5 |
| 48 | 1.5 | 0 | 1.5 | 0 | 1.5 | 1 |
| 64 | 2 | 0 | 2 | 0 | 2.5 | 1 |
| 80 | 2.5 | 0 | 3 | 0 | 2.5 | 1 |
| 96 | 2.5 | 0 | 3 | 0.5 | 3 | 1 |
| 112 | 3.5 | 0 | 3 | 1 | 3 | 1 |
| 128 | 4 | 0.5 | 3 | 1 | 3.5 | 1.5 |
| 144 | 4.5 | 1.5 | 3 | 1 | 4 | 2 |
| 160 | 4.5 | 1.5 | 3 | 1 | 4 | 2 |

As shown in Table 4, adhesion of the antireflective coating to the scratch-resistant coating was significantly improved for each Composition C, D and E when the scratch-resistant coating was modified by exposure to ozone.

EXAMPLE 8

Effect of UV Exposure Time on Adhesion of Antireflective Coating

Scratch-resistant coatings compositions containing three different concentrations of polyhedral oligomeric silsesquioxane were prepared from Composition F (23.4 wt % MA0735), Composition G (46.9 wt % MA0735) and Composition H (70.3 wt % MA0735) as shown in Table 5, and were used to prepare in-mold coated, composite photochromic ophthalmic lenses using the methods described in Example 2. Compositions F, G and H were based on CN9006, an aliphatic urethane acrylate oligomer with acrylate functionality of six, a compound found to form coatings with relatively high abrasion resistance.

TABLE 5

|  | Composition F (wt %) | Composition G (wt %) | Composition H (wt %) |
| --- | --- | --- | --- |
| CN9006 | 22.50 | 15.00 | 7.50 |
| MA0735 | 7.50 | 15.00 | 22.50 |
| Irgacure 184 | 1.95 | 1.95 | 1.95 |
| OSI CS3503 | 0.06 | 0.06 | 0.06 |
| methyl ethyl ketone | 67.99 | 67.99 | 67.99 |

The scratch-resistant coatings were modified by exposure to UV (185 nm) for a period of 2, 3, 4 or 5 minutes using the methods described in Example 4. The UV modified lenses were commercially coated with Endura AR as described in Example 5, and then tested and scored for adhesion of the antireflective coating to the scratch-resistant coating after simulated environmental conditions using the methods described in Example 6. The results of adhesion testing are reported in Table 6.

TABLE 6

Adhesion Of AR Coating To UV Modified Scratch-Resistant Coating

| Env. | Composition F UV Exposure (min.) | | | | Composition G UV Exposure (min.) | | | | Composition H UV Exposure (min.) | | | |
| --- | --- | --- | --- | --- | --- | --- | --- | --- | --- | --- | --- | --- |
| (hrs.) | 2 | 3 | 4 | 5 | 2 | 3 | 4 | 5 | 2 | 3 | 4 | 5 |
| 0 | 0 | 0 | 0 | 0 | 0 | 0 | 0 | 0 | 0 | 0 | 0 | 0 |
| 16 | 0 | 0 | 0 | 0 | 0 | 0 | 0 | 0.5 | 0 | 0 | 0 | 0 |
| 32 | 0.5 | 0 | 0 | 0 | 0 | 0 | 0 | 1 | 0 | 0 | 0 | 0 |
| 48 | 3.5 | 0 | 0 | 0 | 0 | 0 | 0 | 1 | 0 | 0 | 0 | 0 |
| 64 | 3.5 | 0 | 0.5 | 0 | 0 | 0 | 0 | 1 | 0 | 0 | 0 | 0 |
| 80 | 3.5 | 0 | 0.5 | 0 | 0.5 | 0 | 0 | 1 | 0.5 | 0 | 0 | 0 |
| 96 | 4 | 1.5 | 2 | 0 | 0.5 | 0.5 | 0.5 | 1 | 0.5 | 0 | 0 | 0 |
| 112 | 5 | 4.5 | 2.5 | 2.5 | 0.5 | 0.5 | 0.5 | 1 | 1 | 0 | 0 | 0 |
| 128 | 5 | 5 | 5 | 2.5 | 1 | 1 | 0.5 | 1.5 | 1 | 0 | 0 | 0 |
| 144 | 5 | 5 | 5 | 3 | 1 | 1.5 | 0.5 | 2 | 2.5 | 1 | 0 | 0 |
| 160 | 5 | 5 | 5 | 4.5 | 1 | 1.5 | 1 | 2.5 | 2.5 | 1.5 | 0 | 0 |

As shown in Table 4, shorter exposure times generally produce better adhesion results with coatings having higher polyhedral oligomeric silsesquioxane concentrations.

Although the invention has been described in detail with reference to preferred embodiments, variations and modifications exist within the scope and spirit of the invention as described and defined in the following claims.

What is claimed is:

1. A method of making an ophthalmic lens having a scratch-resistant coating, comprising the steps of:
   providing a polymerizable scratch-resistant coating composition comprising a polyhedral oligomeric silsesquioxane;
   polymerizing the scratch-resistant coating composition on the surface of a lens; and
   exposing the polymerized scratch resistant coating composition to oxidizing conditions.

2. The method of claim 1, wherein the polyhedral oligomeric silsesquioxane has a structure selected from the group consisting of:

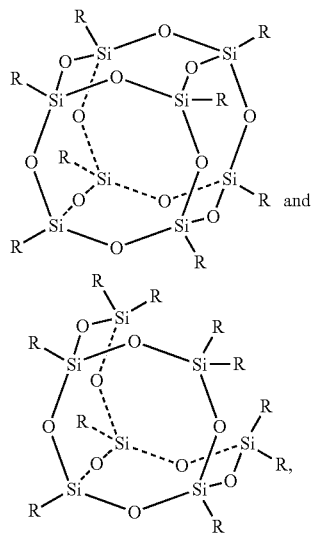

wherein R is one or more substituent groups, at least one of which is capable of forming a chemical bond between polyhedral oligomeric silsesquioxane molecules.

3. The method of claim 1, wherein the polyhedral oligomeric silsesquioxane has a substituent group that is capable of forming a chemical bond between polyhedral oligomeric silsesquioxane molecules.

4. The method of claim 3, wherein the substituent group is ethylenically unsaturated.

5. The method of claim 3, wherein the substituent group is a methacrylate.

6. The method of claim 1, wherein the scratch-resistant coating composition further comprises a monomer and/or oligomer, and wherein the polyhedral oligomeric silsesquioxane has a substituent group that is is capable of forming a chemical bond with the monomer and/or oligomer.

7. The method of claim 6, wherein the substituent group is ethylenically unsaturated and the monomer and/or oligomer is selected from the group consisting of: (meth)acrylic monomers, (meth)acrylic oligomers and combinations thereof.

8. The method of claim 1, wherein the scratch-resistant coating composition is polymerized on the surface of the lens by an in-mold process.

9. The method of claim 1, wherein the oxidizing conditions are selected from the group consisting of: exposure to ozone, oxygen plasma, short wavelength ultraviolet light or electron beam radiation.

10. The method of claim 1, wherein the oxidizing conditions comprise exposure to light at about 185 nm with an irradiance of about 10 milliwatts/cm$^2$.

11. The method of claim 10, wherein the exposure is about 1 minute to about 8 minutes.

12. The method of claim 10, wherein the exposure is about 2 minutes to about 4 minutes.

13. The method of claim 1, wherein the oxidizing conditions comprise exposure to ozone at a concentration of approximately 55 mg/l.

14. The method of claim 13, wherein the exposure is about 2 hours.

15. The method of claim 6, wherein the polyhedral oligomeric silsesquioxane has a structure selected from the group consisting of:

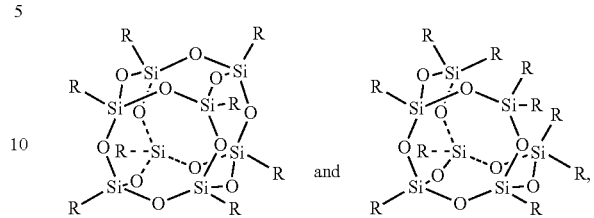

where R is one or more substituent groups.

16. The method of claim 1, wherein the oxidizing conditions comprise exposure to light at less than about 200 nm.

17. An ophthalmic lens comprising:
an optical lens; and
a scratch-resistant coating on the surface of the optical lens, comprising a polymer derived from a polyhedral oligomeric silsesquioxane, and wherein the surface of the scratch resistant coating is chemically modified by exposure to oxidizing conditions.

18. The ophthalmic lens of claim 17, wherein the polyhedral oligomeric silsesquioxane has a structure selected from the group consisting of:

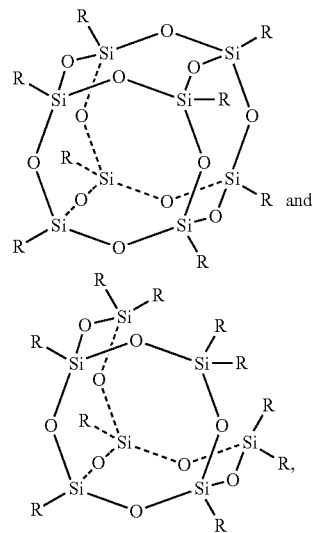

wherein R is one or more substituent groups, at least one of which is capable of forming a chemical bond between polyhedral oligomeric silsesquioxane molecules.

19. The ophthalmic lens of claim 17, wherein the polymer is further derived from a monomer and/or oligomer, and wherein the polyhedral oligomeric silsesquioxane has a substituent group that is capable of forming a chemical bond with the monomer and/or oligomer.

20. The ophthalmic lens of claim 19, wherein the substituent group is ethylenically unsaturated.

21. The ophthalmic lens of claim 19, wherein the monomer and/or oligomer is selected from the group consisting of: (meth)acrylic monomers, (meth)acrylic oligomers and combinations thereof.

22. The ophthalmic lens of claim 19, wherein the substituent group is methacrylate.

23. The ophthalmic lens of claim 17, wherein the oxidizing conditions are selected from the group consisting of: exposure to ozone, oxygen plasma, short wavelength ultraviolet light or electron beam radiation.

24. An ophthalmic lens, comprising:
an optical lens;
a scratch-resistant coating on the surface of the optical lens, comprising a polymer derived from a polyhedral oligomeric silsesquioxane, and wherein the surface of the scratch-resistant coating is chemically modified by exposure to oxidizing conditions; and
an inorganic thin film coating on the surface of the scratch-resistant coating.

25. The ophthalmic lens of claim 24, wherein the inorganic thin film coating comprises a layer of silicon oxide adjacent the surface of the scratch-resistant coating.

26. The ophthalmic lens of claim 24, wherein the oxidizing conditions are selected from the group consisting of: exposure to ozone, oxygen plasma, short wavelength ultraviolet light or electron beam radiation.

27. The ophthalmic lens of claim 24, wherein the polymer is further derived from a monomer and/or oligomer, and wherein the polyhedral oligomeric silsesquioxane has a substituent group that is capable of forming a chemical bond with the monomer and/or oligomer.

28. The ophthalmic lens of claim 27, wherein the substituent group is ethylenically unsaturated.

29. The ophthalmic lens of claim 28, wherein the monomer and/or oligomer is selected from the group consisting of: (meth)acrylic monomers, (meth)acrylic oligomers and combinations thereof.

30. The ophthalmic lens of claim 28, wherein the substituent group is methacrylate.

31. The ophthalmic lens of claim 28, wherein the monomer and/or oligomer is selected from the group consisting of: pentaerythritol triacrylate, pentaerythritol tetraacrylate, dipentaerythritol pentaacrylate, dipentaerythritol hexacrylate, aliphatic and aromatic urethane acrylates and methacrylates, polyester acrylates and methacrylates.

32. The ophthalmic lens of claim 27, wherein the polyhedral oligomeric silsesquioxane comprises from about 10 wt % to about 100 wt % of the mixture of the polyhedral oligomeric silsesquioxane and the monomer and/or oligomer.

33. The ophthalmic lens of claim 27, wherein the polyhedral oligomeric silsesquioxane comprises from about 20 wt % to about 100 wt % of the mixture of the polyhedral oligomeric silsesquioxane and the monomer and/or oligomer.

34. The ophthalmic lens of claim 27, wherein the polyhedral oligomeric silsesquioxane comprises from about 30 wt % to about 100 wt % of the mixture of the polyhedral oligomeric silsesquioxane and the monomer and/or oligomer.

35. The ophthalmic lens of claim 27, wherein the scratch resistant coating further comprises one or more additives selected from the group consisting of: photoinitiators, surfactants, light stabilizers, dyes, adhesion promoters, and combinations thereof.

36. The ophthalmic lens of claim 35, wherein the additives comprise about 10 wt % or less of the total solids in the scratch-resistant coating.

37. The ophthalmic lens of claim 35, wherein the additives comprise about 7 wt % or less of the total solids in the scratch-resistant coating.

38. The ophthalmic lens of claim 27, wherein the polyhedral oligomeric silsesquioxane has a structure selected from the group consisting of:

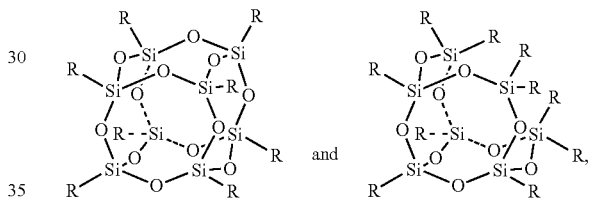

where R is one or more substituent groups.

* * * * *